United States Patent [19]
Croslin et al.

[11] Patent Number: 5,832,196
[45] Date of Patent: Nov. 3, 1998

[54] DYNAMIC RESTORATION PROCESS FOR A TELECOMMUNICATIONS NETWORK

[75] Inventors: William D. Croslin, Colorado Springs, Colo.; Mark W. Sees, Plano, Tex.

[73] Assignee: MCI Communications Corporation, Washington, D.C.

[21] Appl. No.: 673,415

[22] Filed: Jun. 28, 1996

[51] Int. Cl.[6] .............................. H04J 3/14; H04J 1/16
[52] U.S. Cl. .................. 395/182.02; 379/221; 370/400; 370/228; 370/351; 370/218; 395/200.11
[58] Field of Search ..................... 395/182.02, 200.11; 379/221; 370/400, 228, 351, 218

[56] References Cited

U.S. PATENT DOCUMENTS

| | | | |
|---|---|---|---|
| 4,679,189 | 7/1987 | Olson et al. | 370/396 |
| 4,756,019 | 7/1988 | Szybicki | 379/112 |
| 4,825,206 | 4/1989 | Brice et al. | 340/825.02 |
| 4,827,411 | 5/1989 | Arrowood et al. | 395/622 |
| 4,956,835 | 9/1990 | Grover | 370/228 |
| 5,049,783 | 9/1991 | Robins et al. | 340/825.06 |
| 5,101,348 | 3/1992 | Arrowood et al. | 395/200.11 |
| 5,182,744 | 1/1993 | Askew et al. | 370/228 |
| 5,241,534 | 8/1993 | Omuro et al. | 370/218 |
| 5,435,003 | 7/1995 | Chng et al. | 395/182.02 |
| 5,459,716 | 10/1995 | Fahim et al. | 370/228 |
| 5,467,345 | 11/1995 | Cutler et al. | 370/229 |
| 5,537,532 | 7/1996 | Chng et al. | 395/182.02 |

*Primary Examiner*—Ly Hua

[57] ABSTRACT

The invention is a generalized process for dynamically restoring traffic in the event of an outage in a telecommunications network. A Centralized Processing System (CPS) receives alarms from communications ports of diverse network equipment (DNE) elements. The CPS then proceeds to analyze and correlate the alarms in an effort to isolate the location of the outage. In doing so, the CPS utilizes a Network Topology database that is preferably updated in real-time with topology data obtained directly from the DNE network. The CPS will then identify and prioritize all traffic-bearing trunks impacted by the outage. The CPS then generates and implements a restoral route for each impacted trunk by issuing appropriate reroute command to the DNEs. If a DNE responds with an indication that a command failed and that its particular restoral segment is not possible, the CPS updates Network Topology database to indicate this segment as unavailable and proceeds to generate another restoral route. After implementing a restoral route, the CPS verifies that traffic is restored. When the cause of the outage has been fixed, the CPS restores the original route.

11 Claims, 5 Drawing Sheets

DYNAMIC RESTORATION PROCESS FOR A TELECOMMUNICATIONS NETWORK

RELATED APPLICATIONS

This application relates to co-pending U.S. patent application Ser. No. 08/632,200, entitled "Dynamic Network Topology Determination", 08/749,168, entitled "Dynamic Restoration Algorithm, and 08/632,198, entitled "Minimum Common Span Network Outage Detection and Isolation.

FIELD OF THE INVENTION

The present invention relates to the identification and isolation of a failed path within a telecommunications network and to routing traffic around the failed path.

BACKGROUND OF THE INVENTION

A service disruption within existing telecommunications networks is usually resolved by network operators who locate the failed path causing the disruption and reroute network traffic around the failed path. In rerouting the network traffic, network operators look to minimize the duration of the service interruption, to establish the most efficient alternate routing around the failure, and to minimize the cost of rerouting by using as few additional system facilities as possible. In so doing, the operator must devise a plan of routes between network nodes which will avoid the failed path, select the optimal route plan from those devised, and command the network switches to implement the routings specified by the selected route plan.

Figure 1:
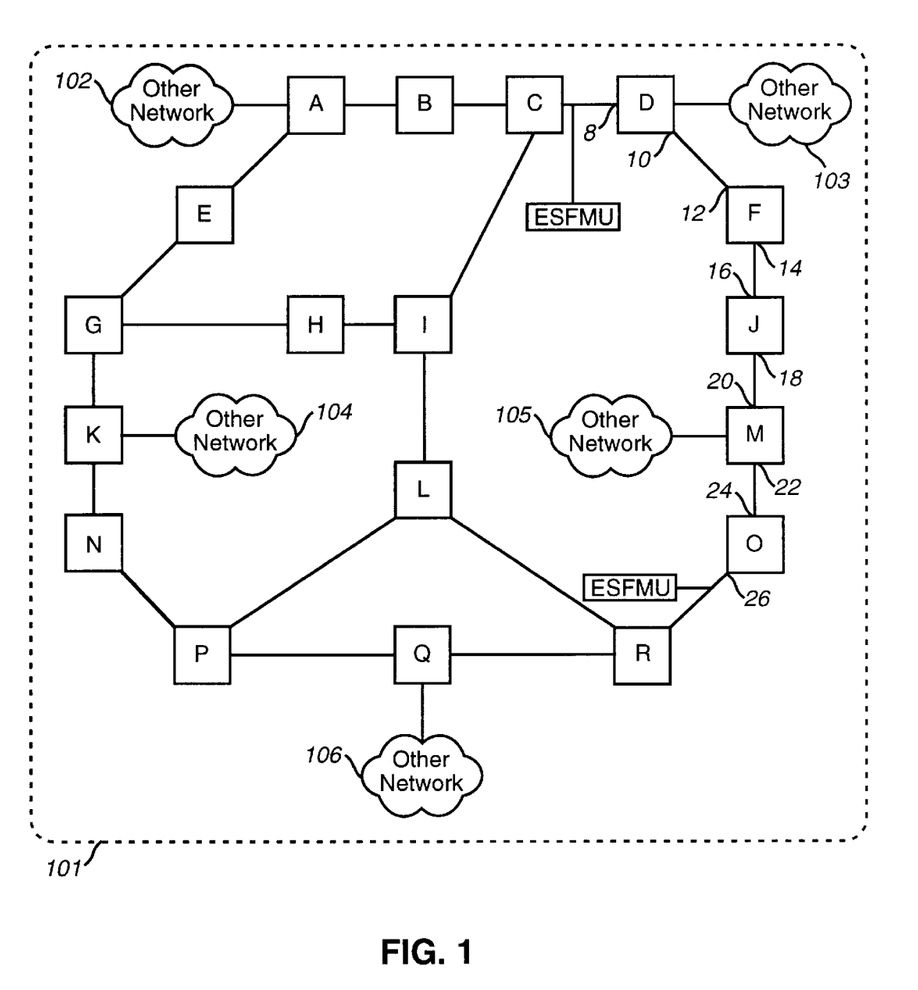
FIG. 1 is a block diagram illustrating an example of a network of diverse network equipment (DNE) nodes.

These tasks have also been accomplished in existing networks by means of intelligent nodes that perform much of the processing involved in isolating a failed path and switching to alternate paths. U.S. Pat. Nos. 5,278,977 to J. Spencer et al., 5,235,599 to Y. Nishimura et al., 5,218,601 to T. Chujo et al. and 5,173,689 to T. Kusano teach methods and algorithms for restoring connection paths in networks of highly intelligent switching nodes. A conventional topology of a network consisting of intelligent switching nodes is shown in FIG. 1 of the drawings. Such systems represent a significant investment to the network operator as each node in the network (e.g. nodes 102 of FIG. 1) must have the processing power needed to identify a failed path, report it to other nodes on the network, and switch to an alternate path. As the connections within the network are constantly changing to cope with traffic requirements, each node must maintain a list or model of available communication paths or must participate in extensive handshaking protocols to establish an alternate path.

An alternative to the system of distributed highly intelligent nodes is a telecommunication network having a central site capable of controlling the connection of alternate routes. U.S. Pat. No. 5,182,744 to J. Askew et al. describes such a restoration system. The central site monitors communication paths for alarm signals from switching nodes. In case such an alarm is detected, an alternative routing plan is established and sent to the individual crossconnect nodes.

Even a centralized restoration system such as described by J. Askew et al. suffers from disadvantages in that each node in the network must poll its terminal equipment for failure alarms and process them for broadcast to the central site. In addition, the central site must continuously maintain a model or record of the current state of the network. Failure alarms generated at the switching node are then interpreted in terms of this model in order to select or devise an alternative routing.

In current centralized network restoration systems, the central site takes up some of the processing load from the nodes within the network by supplying a routing plan in case of failure. It would be desirable to further concentrate restoration processing tasks at the central site by centrally processing node alarms to isolate failed network paths.

SUMMARY OF THE PRESENT INVENTION

The invention is a generalized process for dynamically restoring traffic in the event of an outage in a telecommunications network. A Centralized Processing System (CPS) receives alarms from communications ports of diverse network equipment (DNE) elements. The CPS then proceeds to analyze and correlate the alarms in an effort to isolate the location of the outage. In doing so, the CPS utilizes a Network Topology database that is preferably updated in real-time with topology data obtained directly from the DNE network. The CPS will then identify and prioritize all traffic-bearing trunks impacted by the outage. The CPS then generates and implements a restoral route for each impacted trunk by issuing appropriate reroute command to the DNEs. If a DNE responds with an indication that a command failed and that its particular restoral segment is not possible, the CPS updates Network Topology database to indicate this segment as unavailable and proceeds to generate another restoral route. After implementing a restoral route, the CPS verifies that traffic is restored. When the cause of the outage has been fixed, the CPS restores the original route.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

An example of a telecommunications network 101 is illustrated in FIG. 1. A plurality of nodes A . . . R represent Diverse Network Equipment (DNE). These DNE are interconnected by communications links to provide network capacity needed to carry telecommunications traffic. DNE may be of various types of telecommunications network equipment. Some examples are digital cross connects or intelligent matrix switches. Such DNE consists of several communications ports that are capable of generating an alarm signal when a failure or degradation in communications is detected.

In FIG. 1, for example, network 101 consists of network capacity which traverses the network by connecting DNE nodes, as in A . . . R. Each piece of this network capacity which connects two DNE nodes can be referred to as a "segment", as in A-B, A-E, E-G, etc. In order to create network capacity which reaches from one DNE to another, as in A to H, segments are combined to create "trunks". There are numerous routes within network 101 to connect DNE A to DNE H, as in A-E-G-H, A-B-C-I-H, A-E-G-K-N-P-L-I-H, etc.

Also, network 101 is deemed to have a quantity of connections across a segment which may be dynamically adjusted by some process external to the invention, thus expanding or reducing the quantity of connections across a segment. For instance, the A-E segment may have 2 connections between network equipment elements A and E. This would allow the generation of up to 2 restoral routes utilizing the A-E segment. However, network failures may cause some or all of these 2 A-E segment connections to become non-viable, forcing the restoral routes to change.

Further, network 101 consists of both trunks which are made up of segment connections which are carrying live traffic and of segments which are to be treated as "spare" capacity which may be available for creation of network restoral routes.

Further, two segments that have different pairs of DNE nodes as end points, such as segment E-G and segment G-H, may actually share a common physical transmission route. This common route may only apply to part of each segment, or the entirety of one or both segments. As a consequence, if a failure (i.e., fiber cut) occurs on the physical transmission route that is common to segment E-G and segment G-H, alarms from DNE nodes E, G, and H will be generated. A network restoration system must be able to determine that this is a single failure impacting multiple segments, rather than two different failures.

As can be seen at network equipment elements A, D, K, M and Q in network 1 0 1, these network equipment elements attach to other networks 102 . . . 106 which, if utilized for restoral route generation would generate routes which are not viable for restoring traffic within network 101. A network restoration system must be able to exclude such capacity from use as restoral routes within network 101.

For purposes of this presentation, a "traffic" trunk is deemed to exist between network equipment elements A and H, with the segments being A-E-G-H. When a portion of this traffic trunk is in failure, the trunk is said to be "impacted" between two network equipment elements. For example, if a network failure occurs between network equipment elements E and G, the A-E-G-H traffic trunk is said to be impacted on the E-G segment. Further, a network failure may or may not impact the "spare" segment connections in the same way that the traffic trunk is impacted. The availability of spare segment connections is detected and monitored by a sub-process of the present invention. This sub-process will dynamically adjust the number of available segment connections as the network failures occur.

If a failure or outage occurs on an inter-DNE segment, only those DNE ports facing the outage and supporting an impacted trunk will generate an alarm. For example, suppose an outage occurs on segment F-J in FIG. 1, and a DS-3 trunk that spans D-F-J-M-O is impacted. Only ports 10, 14, 16, 20, and 24 will generate alarms, as these ports "face" the outage on segment F-J. Ports 12, 18, 22 and 26 do not "face" the outage and will not generate alarms. This fact is important in isolating the location of the failure, as will be described in reference to the process shown in FIG. 3.

Figure 2:
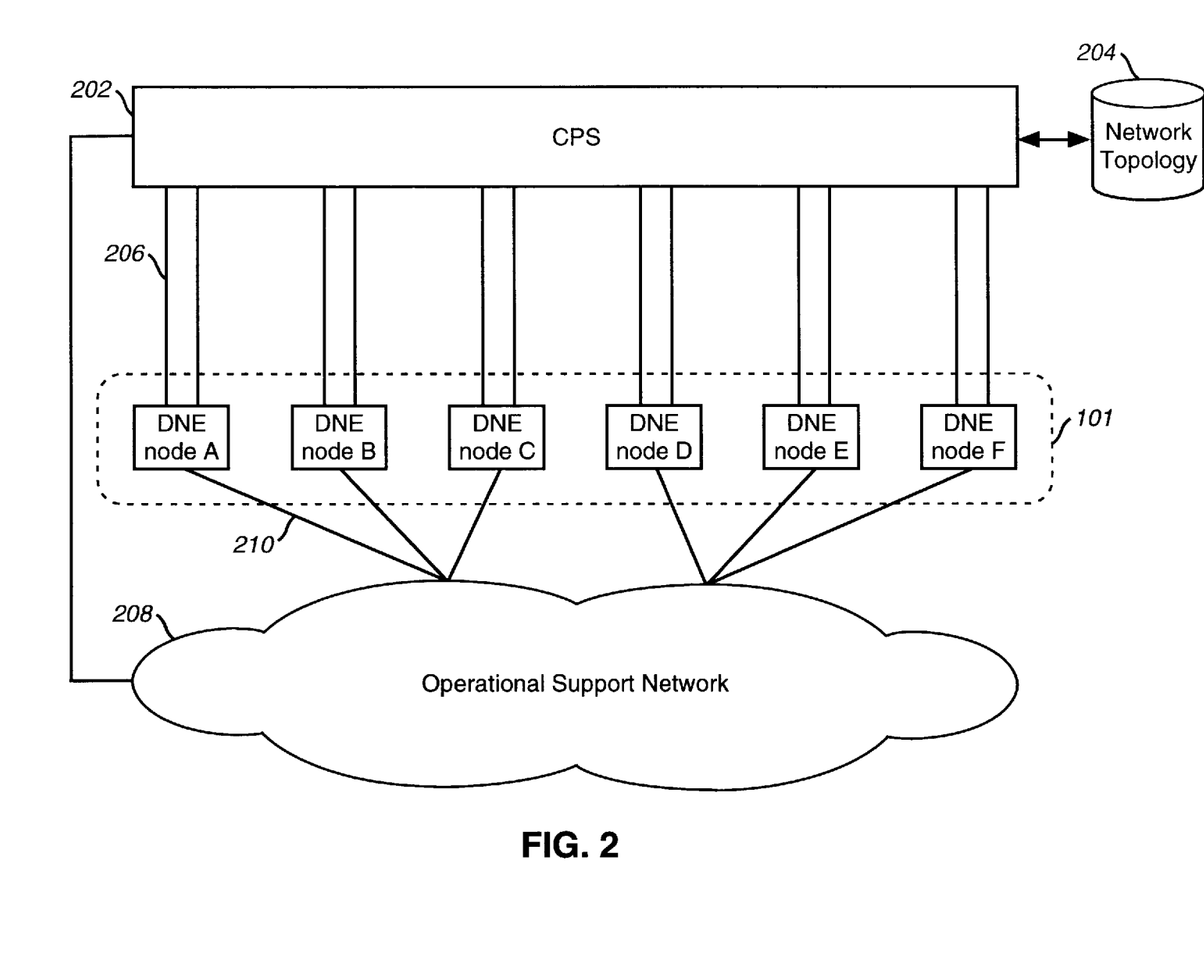
FIG. 2 is a block diagram illustrating connectivity of DNE nodes to a Centralized Processing System (CPS), in accordance with the preferred embodiment of the present invention.

Referring now to FIG. 2, a preferred embodiment of the present invention is shown, utilizing a Centralized Processing System (CPS) 202. The CPS 202 has direct and redundant connectivity to each DNE in the network, as shown by links 206. These links are conventional communications links, and are dedicated to the CPS restoration process. The CPS 202 may be manifest as any of various computer processors. These include mainframe computers, such as a DEC VAX, and midrange computers, such as an IBM RS6000. To support communications links 206, the CPS 202 has two communications ports for each DNE. For simplicity of the illustration, interconnectivity among the DNEs is not illustrated in FIG. 2.

Links 206 are used by the DNEs to send alarms to the CPS 202, and by the CPS 202 to send control commands to the DNE. Other types of signals pertaining to the restoration process may be sent over these links 206, as will be described in reference to the process illustrated in FIGS. 3 and 4.

The CPS 202 has access to a Network Topology database 204. This database is preferably manifest on the same computer component as the CPS 202, so that they may share memory resources. The Network Topology database 204 maintains data that describes the topology of the DNE network 101. This includes individual DNE configuration, inter-DNE connectivity, utilized network capacity, and spare network capacity. As part of one embodiment of the present invention, the Network Topology database 204 is dynamically updated with real-time data from the network 101 to reflect the most current topology of the network 101.

As a backup to the links 206, the present invention may use an Operational Support Network (OSN) 208. The OSN 208 is preferably a switched packet network, such as a Siemens X.25 network. The OSN 208 has connectivity to each DNE via communications links 210. In case of failure of links 206, the CPS 202 will send and receive signals to and from the DNEs via the OSN 208.

Other backup methods not illustrated in FIG. 2 may also be used. For example, a telecommunications network generally employs a network management center that has dial-up access to each DNE in the network. Commands may be sent from the CPS to the network management center. Personnel at the network management center may then access the DNEs via dial-up connections and send the commands. Alternatively, commands may be manually called in to field personnel working at each of the DNE sites, who can then access the DNEs directly.

In the event of a network outage, the DNE ports of the impacted trunks will generate alarms. It is important to note that DNE ports of not just the impacted segments, but also of the impacted trunks will generate alarms. For example, referring to FIG. 1, if an outage occurs on the segment between nodes F and J, ports on nodes F and J that support that segment will generate alarms. In addition, ports on nodes C, D, M, O, R, and possibly others that support trunks on impacted segment F-J will also generate alarms.

Hence, a multitude of alarms will be generated for a single network outage. The present invention is able to analyze the various alarms, correlate them to a single outage, isolate where that outage occurred, and generate a new route circumventing the outage to restore traffic.

When alarms from the DNE ports are generated, they are sent over links 206 to the CPS 202. The CPS then performs the process illustrated in FIG. 3.

Flowcharts

Figure 3:
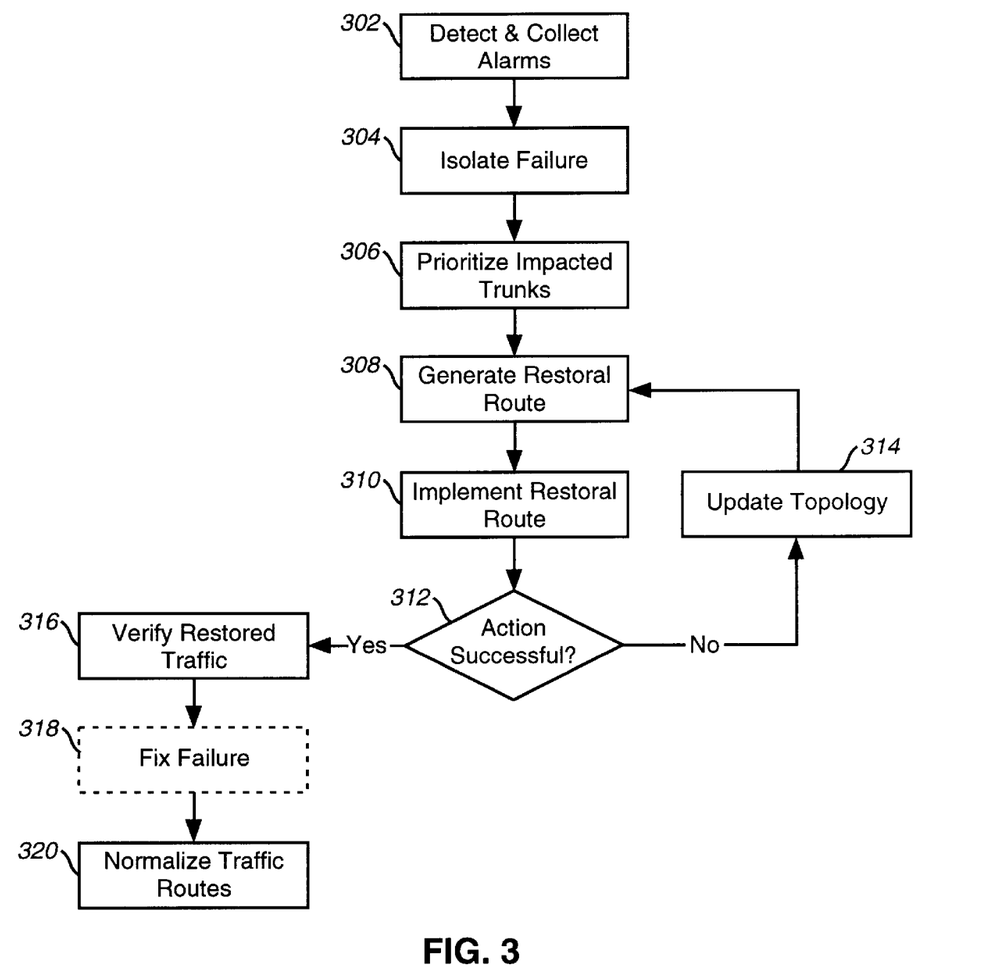
FIG. 3 is a process flowchart of the operation of the present invention.

Referring now to FIG. 3, the process performed on the CPS is shown. In step 302 the CPS 202 detects alarms being received from the DNEs over links 206, and collects all alarms received in a given period of time.

In step 304, the CPS 202 isolates where the failure has occurred in the network. To accomplish this task, the CPS 202 correlates by trunk the various alarms received, and then minimizes the inter-DNE span that has failed. To correlate the alarms, the CPS 202 references the Network Topology Database 204 to determine which trunks are supported by alarming ports. For example, if 12 different alarming DNE ports all support a common DS-3 trunk, these alarms may be correlated to the same outage.

The Network Topology database 204 also contains data relating trunks and ports to physical routes. In this way, alarming ports that support different trunks may also be correlated to a common outage. For example, if ports supporting two different DS-3 trunks between nodes A and B (referring to FIG. 1) are in alarm, and the CPS 202 queries the Network Topology database 204 to determine that the two DS-3 trunks share a common physical route between nodes A and B, these alarms may be correlated to the same outage.

To minimize the span that has failed, various algorithms may be employed by the CPS 202. One example of such an algorithm is described in claimed in co-pending U.S. patent application titled "Minimum Common Span Network Outage Detection and Isolation" (1643/344). A simpler approach for the CPS 202 to take is to first identify all alarming ports that support a common trunk, then traverse the network from the ports farthest apart to the ports closest together. For example, suppose alarms are received from ports on nodes D, F, J, M, and O (referring to FIG. 1) and these ports all support a common trunk D-F-J-M-O. Further suppose that the cause of these alarms is an outage on segment F-J, as was described in the example used in reference to FIG. 1. Remembering that only "near-side" ports will generate alarms (that is to say, ports 10, 14, 16, 20, and 24), the CPS 202 process will begin with ports 10 and 24. Then it will traverse to ports closer together, forming a smaller span. That is, it will traverse to ports 14 and 20. Finally, it will traverse to ports 14 and 16. At this point, it will have isolated the failure to segment F-J.

In step 306, after isolating the location of the outage, the CPS 202 identifies and prioritizes all trunks impacted by the outage. By querying the Network Topology database 204 for all trunks supported by the failed segment that was isolated in step 304, impacted trunks are identified. These trunks carry traffic that need to be restored. Traffic is restored on a trunk-by-trunk basis. That is to say, a restoral route is first generated for one trunk or even a small group of trunks. Then another restoral route, which may be different from the first, is generated for another trunk or small group of trunks. Thus, restoral routes are generated for the various impacted trunks in a certain order. Therefore, there is a need to prioritize these trunks by the type of traffic carried so that the most important trunks (trunks carrying the most important traffic) are restored first. Data specifying types of traffic carried on various trunks are found in the Network Topology database 204.

Prioritizing may be accomplished in a number of ways, according to the needs and desires of the network service provider. One example of order of priority is:
1.) network control trunks,
2.) government trunks,
3.) trunks dedicated to customers who pay for restoration services,
4.) switched network trunks,
5.) trunks dedicated to customers who intentionally do not pay for restoration services.

In step 308, once a prioritized list of impacted trunks that need restoration is created, a restoral route for each trunk is generated. Restoral routes are generated using spare capacity in the network. Such spare capacity may be found on spare trunks dedicated to restoration as well as underutilized trunks, depending on the needs of the service provider. Data specifying what trunks can be used for restoration are found in the Network Topology database 204.

Using spare trunks identified for restoration (obtained from the Network Topology database 204) and the prioritized list of impacted trunks in need of restoration (created in step 306), step 308 generates an optimal restoral route for each impacted trunk on the list. To accomplish this, various algorithms may be used.

One example of such an algorithm is described and claimed in co-pending U.S. patent application titled "Dynamic Restoration Algorithm" (Ser. No. 08/749,168). This algorithm will generate the optimal restoral route based on calculated costs of various routes. Each segment connection is assigned a cost which may be derived from numerous factors such as distance, quality of connection equipment, projected survivability, etc. This cost may be dynamically adjusted to increase or decrease the likelihood the routing algorithm will utilize the segment connection in a restoral route. The optimal route is deemed to be the route which has the minimal accumulated cost across the route. The cost of each segment connection within the restoral route is accumulated in addition to other costs which may be induced into the algorithm as needed. These additional costs might be length of segment connection, number of segments utilized from the original traffic trunk, number of spare segment connections utilized in the restoral route, etc.

In addition, this algorithm is capable of eliminating non-viable routes, such as those incorporating other networks 102, 103, 104, 105, and 106 (referring to FIG. 1).

Other algorithms and methods may be used. In the simplest manner, a spare capacity re-route for each traffic-bearing trunk may be programmed into the Network Topology database 204. Other, more dynamic methods are preferred to obtain optimal restoral routes.

In step 310, the restoral route that was generated in step 308 is implemented. Implementation is generally performed by the CPS 202 sending reconfiguration commands to specific DNEs to re-route traffic. For example, if a DNE is a digital cross connect, the CPS 202 will send a command to the DNE to perform the cross connects needed to provide the appropriate restoral route.

When a command is sent to a DNE to perform an action, the DNE will generally send a response back to the CPS 202 confirming the success or failure of the action. A potential bottleneck exists in that responses may start coming in to the CPS 202 while commands are still being sent. This would cause delays in sending commands. To avoid this, the CPS 202 utilizes a separate, independent send/receive process for each DNE. In this manner, communications processes with each DNE occur parallel to each other.

It is possible that an action to be performed by a DNE in implementing a restoral route may fail. For example, a port on a digital cross connect may be defective, but will not generate an alarm if it is not currently cross-connected to another port. Suppose this port is to be used to perform a cross-connect to create a restoral route. When the cross-connect is made, the port is determined at that time to be defective and an alarm is generated. The alarm is sent to the CPS 202, which must then identify this port as defective, and generate a new restoral route.

In step 312, based on the response received from the DNE, the CPS 202 determines if the action was successful.

If the action failed, then in step 314 the CPS 202 updates the network topology in the Network Topology database 204 to indicate the corresponding capacity to be unavailable for restoration. The CPS 202 returns the trunk it was trying to restore back to its original place in the priority list. The process then returns to step 308, where a new restoral route must be generated using the updated network topology.

If in step 312 the CPS 202 determines the action was successful, then it proceeds to step 316, where it verifies that traffic was restored. Several methods may be employed to accomplish this. In one example, the CPS 202 sends commands to various DNE that were not part of the restoration process. Such DNE are referred to as secondary DNE. An example of a secondary DNE would be an Extended Superframe Monitoring Unit (ESFMU), which is used to monitor ports on DS-3 trunks. The CPS 202 sends a command to a secondary DNE that supports one end of the restored trunk; this command instructs the secondary DNE to send a signal down the trunk. The CPS 202 also sends a command to another secondary DNE that supports the other end of the restored trunk; this command requests confirmation that the signal was received. If such confirmation is returned to the CPS 202, then the CPS 202 knows the trunk was restored.

To illustrate the above example, referring back to the example of an outage on segment F-J (FIG. 1) impacting trunk D-F-J-M-O, suppose the restoral route was on trunk D-C-I-L-R-O. Then to verify restored traffic in step 316, the CPS 202 sends a command to an ESFMU supporting port 8 on DNE node D. This command is to send a signal down the trunk D-C-I-L-R-O. The CPS 202 also sends a command to an ESFMU supporting port 26 on DNE node 0. This command requests confirmation if the signal from the ESFMU on port 8 is received.

Other methods exist to verify traffic is restored. The prior art describes methods in which individual DNE elements exchange self-identification signals with other DNE elements in direct connection. The receipt of such self-identification signals is confirmed to the CPS. The CPS can then determine current connectivity among DNE nodes.

Step 318 represents a process external to the present invention in which the network failure is fixed. Once fixed, a system operator of the CPS 202 will trigger the traffic normalization process of step 320.

In step 320, traffic is normalized by restoring the original traffic route. The flow of commands that were issued to implement the restoral route in step 310 is reversed so that, in a similar manner, the original route is implemented. One hazard in such an operation is a disruption to traffic due to the process of disconnecting one route and connecting another. Generally, these cross connections cannot be made with sufficient speed as to not affect live traffic. Therefore, a patch-and-roll procedure is used.

Figure 5:
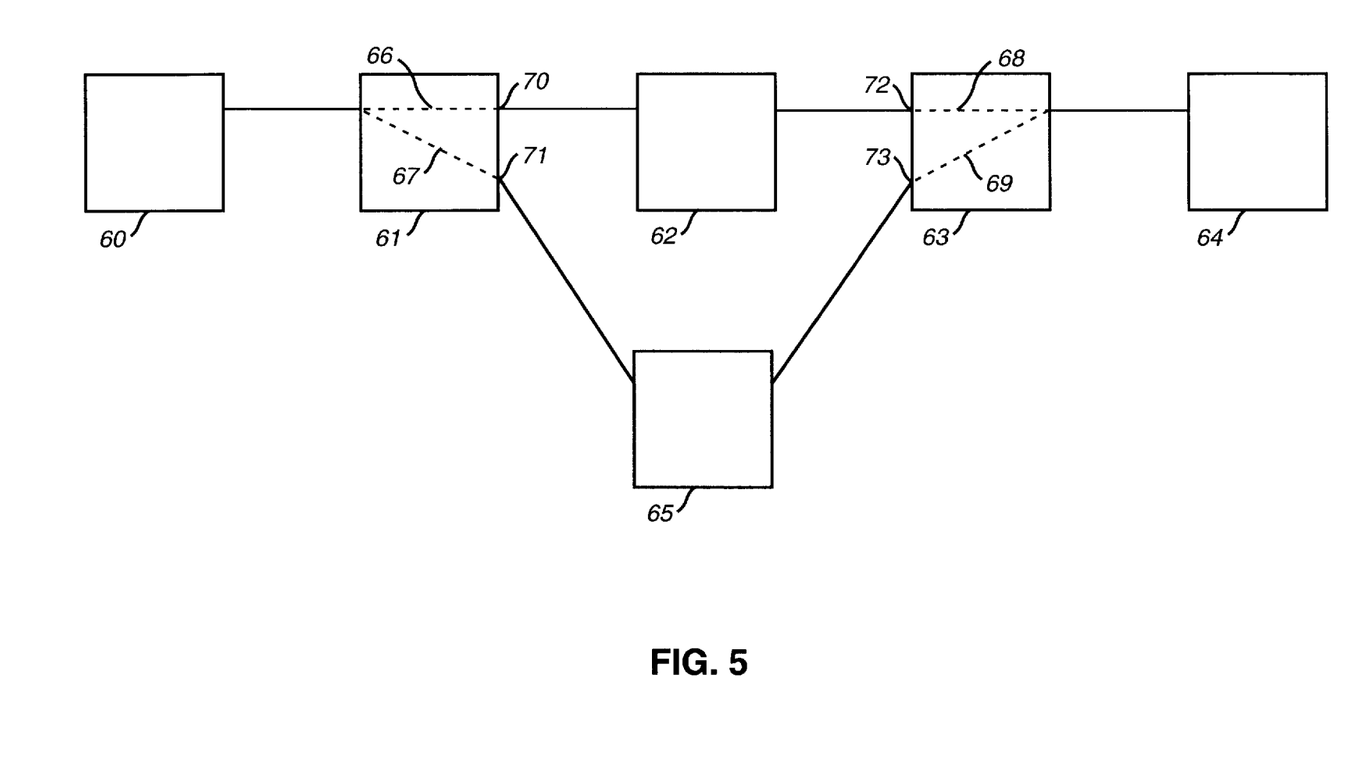
FIG. 5 is a block diagram illustrating a technique of restoring the original traffic route, as specified in step 320 of FIGS. 3 and 4.

The patch-and-roll procedure is performed as follows. Referring to FIG. 5, suppose that the original traffic route is represented by a trunk connecting DNEs 60-61-62-63-64, and the currently active restored traffic route is represented by a trunk connecting DNEs 60-61-65-63-64. To restore the original route, live traffic must be transferred from cross-connect 67 to cross-connect 66, and from cross-connect 69 to cross-connect 68. The time required to simply perform these cross-connects straight forward is great enough so as to disrupt live traffic. Instead, a command is first issued to DNE 61 to transmit with both cross-connects 67 and 66. Hence, DNE 61 is transmitting simultaneously from ports 70 and 71. But it is receiving only on port 71, using cross-connect 67, in accordance with the active restoral route.

Similarly, a command is issued to DNE 63 to transmit with both cross-connects 68 and 69. Hence, DNE 63 is transmitting simultaneously from ports 72 and 73. But it is receiving only on port 73, using cross-connect 69, in accordance with the active restoral route.

The transmissions on port 70 of DNE 61 (using cross-connect 66) and on port 72 of DNE 63 (using cross-connect 68) are real but are not considered live, since they are not being received at any distant end. This is because ports 70 and 72 are not yet receiving.

Then the CPS 202 issues commands to DNE 61 and DNE 63 to begin receiving on ports 70 and 72, respectively. When these new receiving ports have confirmed successful signal receptions, commands are issued to terminate transmission/reception on ports 71 and 73 by disengaging cross-connects 67 and 69, respectively. At this point, the original traffic route over trunk 60-61-62-63-64 is active.

Figure 4:
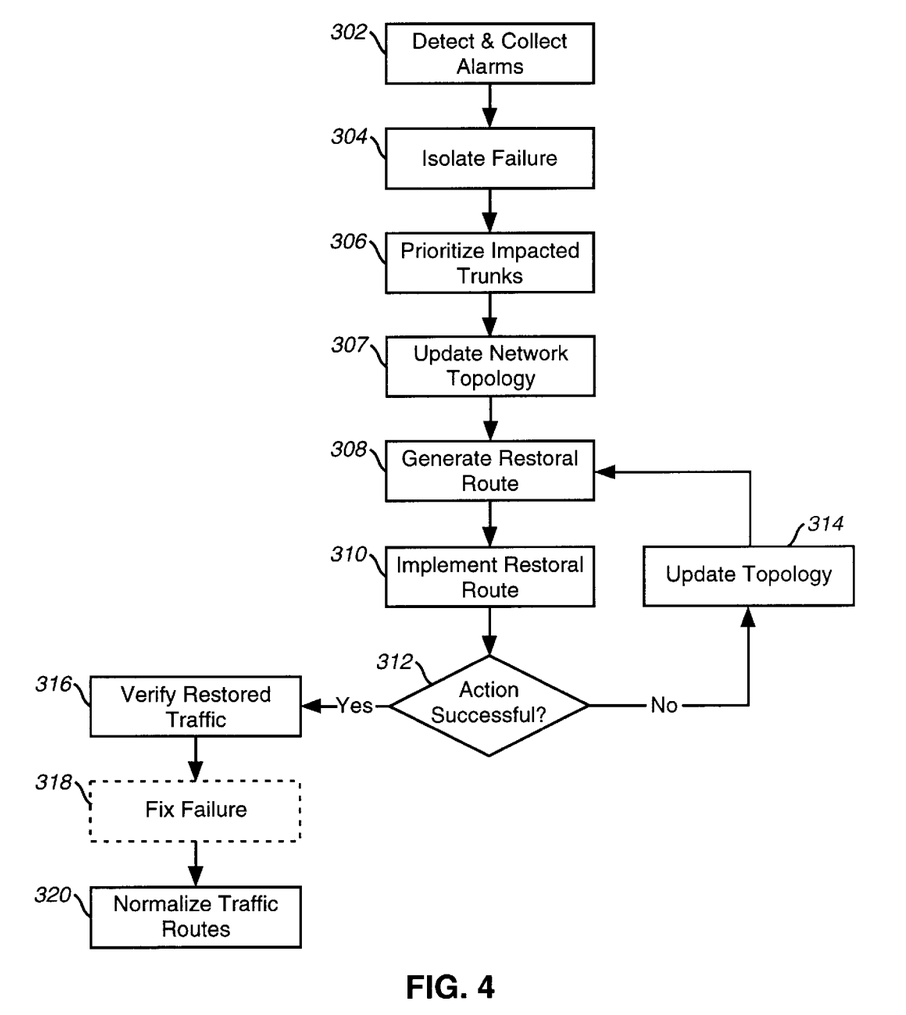
FIG. 4 is a process flowchart of a preferred operation of the present invention.

Other embodiments of the present invention exist. FIG. 4 illustrates an enhancement to the process shown in FIG. 3. The process in FIG. 4 is identical to the process in FIG. 3, with the addition of step 307.

Referring to FIG. 4 in step 307, prior to generating a restoral route, the network topology contained within the Network Topology database 204 is updated to reflect the most current state of the network 101. This update is preferrably performed in real-time, using data obtained directly from the network 101. Several methods exist for such a dynamic topology update. One example is described and claimed in co-pending U.S. patent application titled "Dynamic Network Topology Determination" (1643/063). This invention uses mismatched signal alarms generated by intentional cross-connects of differently configured ports within a DNE to determine the current interconnectivity of DNEs. Other methods of determining current network topology exist in the art.

By using real-time network topology as input to the restoral route generation of step 308, the chances of encountering action failure when implementing the restoral route are reduced.

It should be understood that the invention is not limited to the exact details of construction shown and described herein for obvious modifications will occur to persons skilled in the art.

We claim:

1. A dynamic restoration process for a telecommunication network having a plurality of diverse network equipment (DNE) elements interconnected over network trunks thus forming a network topology, the process comprising the steps:

connecting inputs of a centralized processing system (CPS) to outputs from a plurality of DNEs;

maintaining a database of network topology;

sending fault alarms from DNEs to the CPS;

collecting data relating to the alarms in the CPS;

correlating the received alarms by trunk thereby isolating the location of the fault in the network;

identifying trunks impacted by the fault;

prioritizing the impacted trunks by the type of traffic carried thereby ensuring earliest restoration on important trunks;

generating optimum restoral routes for each impacted trunk;

selecting a final restoral route of impacted trunks on a prioritized basis dependent on the relative importance of the impacted trunks;

generating reconfiguration commands at the CPS in accordance with the selected restoral route;

sending the commands to selected DNEs to execute corresponding actions required for implementing the selected restoral route;

generating a response at a selected DNE indicating success or failure of the action to be executed;

determining that the actions have been successfully completed by the DNEs;

verifying that a restoral route has resulted in restored traffic; and reversing the reconfiguration commands by the CPS to the selected DNEs for restoring an original traffic route following repair of the fault.

2. The process set forth in claim 1 further comprising the steps of:

detecting when the actions have not been successfully completed;

updating the network topology database to indicate which path of the restoral route is inoperative; and selecting an alternate restoral route of impacted trunks on a prioritized basis excluding the inoperative path.

3. The process set forth in claim 1 wherein the step of correlating the received alarms occurs by referencing the database to determine which trunks are supported by the alarming DNEs.

4. The process set forth in claim 1 wherein the step of sending the commands to selected DNEs to execute corresponding actions required for implementing the selected restoral route is performed separately and independently of the step of generating a response at a selected DNE indicating success or failure of the action to be executed, thereby avoiding interference between sent commands and generated responses.

5. The process set forth in claim 1 wherein, prior to selecting a restoral route of impacted trunks on a prioritized basis, the database is updated to reflect an instantaneous state of the network.

6. A dynamic restoration process for a telecommunication network having a plurality of diverse network equipment (DNE) elements interconnected over network trunks thus forming a network topology, the process comprising the steps:

connecting inputs of a centralized processing system (CPS) to outputs from a plurality of DNEs;

maintaining a database of network topology;

sending fault alarms from DNEs to the CPS;

collecting data relating to the alarms in the CPS;

correlating the received alarms by trunk thereby isolating the location of the fault in the network;

identifying trunks impacted by the fault;

prioritizing the impacted trunks by the type of traffic carried thereby ensuring earliest restoration on important trunks;

generating optimum restoral routes for each impacted trunk;

selecting a final restoral route of impacted trunks on a prioritized basis dependent on the relative importance of the impacted trunks;

generating reconfiguration commands at the CPS in accordance with the selected restoral route;

sending the commands to selected DNEs to execute corresponding actions required for implementing the selected restoral route;

generating a response at a selected DNE indicating success or failure of the action to be executed;

determining that the actions have been successfully completed by the DNEs;

verifying that a restoral route has resulted in restored traffic; and reversing the reconfiguration commands by the CPS to the selected DNEs for restoring an original traffic route following repair of the fault;

wherein the step of identifying trunks impacted by the fault further includes the steps of identifying all alarming DNE ports that support a common trunk; and incrementally stepping inward from the ports farthest apart to a single network segment wherein the ports face the fault.

7. A dynamic restoration process for a telecommunication network having a plurality of diverse network equipment (DNE) elements interconnected over network trunks thus forming a network topology, the process comprising the steps:

connecting inputs of a centralized processing system (CPS) to outputs from a plurality of DNEs;

maintaining a database of network topology;

sending fault alarms from DNEs to the CPS;

collecting data relating to the alarms in the CPS;

correlating the received alarms by trunk thereby isolating the location of the fault in the network;

identifying trunks impacted by the fault;

prioritizing the impacted trunks by the type of traffic carried thereby ensuring earliest restoration on important trunks;

generating optimum restoral routes for each impacted trunk;

selecting a final restoral route of impacted trunks on a prioritized basis dependent on the relative importance of the impacted trunks;

generating reconfiguration commands at the CPS in accordance with the selected restoral route;

sending the commands to selected DNEs to execute corresponding actions required for implementing the selected restoral route;

generating a response at a selected DNE indicating success or failure of the action to be executed;

determining that the actions have been successfully completed by the DNEs;

verifying that a restoral route has resulted in restored traffic; and reversing the reconfiguration commands by the CPS to the selected DNEs for restoring an original traffic route following repair of the fault;

wherein determining that the actions have been successfully completed by the DNEs further includes the steps of introducing a signal from a first secondary DNE, at one end of a trunk at the restoral route, to a second DNE at a second end of the restoral route; and confirming, that the signal was received by the second DNE.

8. A dynamic restoration process for a telecommunication network having a plurality of diverse network equipment (DNE) elements interconnected over network trunks thus forming a network topology, the process comprising the steps:

connecting inputs of a centralized processing system (CPS) to outputs from a plurality of DNEs;

maintaining a database of network topology;

sending fault alarms from DNEs to the CPS;

collecting data relating to the alarms in the CPS;

correlating the received alarms by trunk thereby isolating the location of the fault in the network;

identifying trunks impacted by the fault;

prioritizing the impacted trunks by the type of traffic carried thereby ensuring earliest restoration on important trunks;

generating optimum restoral routes for each impacted trunk;

selecting a final restoral route of impacted trunks on a prioritized basis dependent on the relative importance of the impacted trunks;

generating reconfiguration commands at the CPS in accordance with the selected restoral route;

sending the commands to selected DNEs to execute corresponding actions required for implementing the selected restoral route;

generating a response at a selected DNE indicating success or failure of the action to be executed;

determining that the actions have been successfully completed by the DNEs;

verifying that a restoral route has resulted in restored traffic; and reversing the reconfiguration commands by the CPS to the selected DNEs for restoring an original traffic route following repair of the fault;

wherein restoring an original traffic route following repair of the fault includes a patch-and-roll procedure further includes the of steps simultaneously transmitting signals from ports of a cross-connect of a first DNE located at a first branch that connects a first end of a restoral path with a first end of an original path;

simultaneously transmitting signals from ports of a cross-connect of a second DNE located at a second branch that connects a second end of a restoral path with a second end of an original path;

receiving signals at those ports of the cross-connects located at the first and second branches that were included in the original path; and disengaging the ports of the cross-connects located at the first and second branches included in the restoral path.

9. A dynamic restoration process for a telecommunication network having a plurality of diverse network equipment (DNE) elements interconnected over network trunks thus forming a network topology, the process comprising the steps:

connecting inputs of a centralized processing system (CPS) to outputs from a plurality of DNEs;

maintaining a database of network topology;

sending fault alarms from DNEs to the CPS;

collecting data relating to the alarms in the CPS;

correlating the received alarms by trunk thereby isolating the location of the fault in the network, the correlating referencing the database to determine which trunks are supported by the alarming DNEs;

identifying trunks impacted by the fault by identifying all alarming DNE ports that support a common trunk;

incrementally stepping inward from the ports farthest apart to a single network segment wherein the ports face the fault;

prioritizing the impacted trunks by the type of traffic carried thereby ensuring earliest restoration on important trunks;

generating optimum restoral routes for each empacted trunk;

selecting a final restoral route of impacted trunks on a prioritized basis dependent on the relative importance of the impacted trunks;

generating reconfiguration commands at the CPS in accordance with the selected restoral route;

sending the commands to selected DNEs to execute corresponding actions required for implementing the selected restoral route;

generating a response at a selected DNE indicating success or failure of the action to be executed;

wherein the step of sending the commands to selected DNEs to execute corresponding actions required for implementing the selected restoral routes is performed separately and independently of the step of generating a response at a selected DNE indicating success or failure of the action to be executed, thereby avoiding interference between sent commands and generated responses;

detecting when the actions have not been successfully completed;

updating the network topology database to indicate which path of the restoral route is inoperative;

selecting an alternate restoral route of impacted trunks on a prioritized basis excluding the inoperative path;

determining that the actions have been successfully completed by the DNEs;

verifying that a restoral route has resulted in restored traffic; and reversing the reconfiguration commands by the CPS to the selected DNEs for restoring an original traffic route following repair of the fault.

10. The process set forth in claim 9 wherein determining that the actions have been successfully completed by the DNEs comprises the steps:

of introducing a signal from a first secondary DNE, at one end of a trunk at the restoral route, to a second DNE at a second end of the restoral route; and confirming, that the signal was received by the second DNE.

11. The process set forth in claim 9 wherein, prior to selecting a restoral route of impacted trunks on a prioritized basis, the database is updated to reflect an instantaneous state of the network; and further wherein restoring an original traffic route following repair of the fault includes a patch-and-roll procedure comprising the steps:

simultaneously transmitting signals from ports of a cross-connect of a first DNE located at a first branch that connects a first end of a restoral path with a first end of an original path;

simultaneously transmitting signals from ports of a cross-connect of a second DNE located at a second branch that connects a second end of a restoral path with a second end of an original path;

receiving signals at those ports of the cross-connects located at the first and second branches that were included in the original path; and disengaging the ports of the cross-connects located at the first and second branches included in the restoral path.

* * * * *

UNITED STATES PATENT AND TRADEMARK OFFICE
CERTIFICATE OF CORRECTION

PATENT NO. : 5,832,196
DATED : November 3, 1998
INVENTOR(S) : William D. Croslin, et al.

It is certified that error appears in the above-indentified patent and that said Letters Patent is hereby corrected as shown below:

On title page, item [56] insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 2 | 7 | 8 | 9 | 7 | 01/11/94 | Spencer et al. | | | |
| | | 5 | 2 | 1 | 8 | 6 | 0 | 06/08/93 | Chujo et al. | | | |
| | | 5 | 0 | 1 | 6 | 2 | 4 | 05/14/91 | Fite, Jr. | | | |
| | | 5 | 1 | 7 | 3 | 6 | 8 | 12/22/92 | Kusano | | | |
| | | 4 | 9 | 9 | 9 | 8 | 2 | 03/12/91 | Fite, Jr. et al. | | | |
| | | 5 | 2 | 3 | 5 | 5 | 9 | 08/10/93 | Nishimura et al. | | | |
| | | | | | | | | | | | | |
| | | | | | | | | | | | | |

Signed and Sealed this

Second Day of November, 1999

Attest:

Q. TODD DICKINSON

*Attesting Officer*     *Acting Commissioner of Patents and Trademarks*